2,157,314

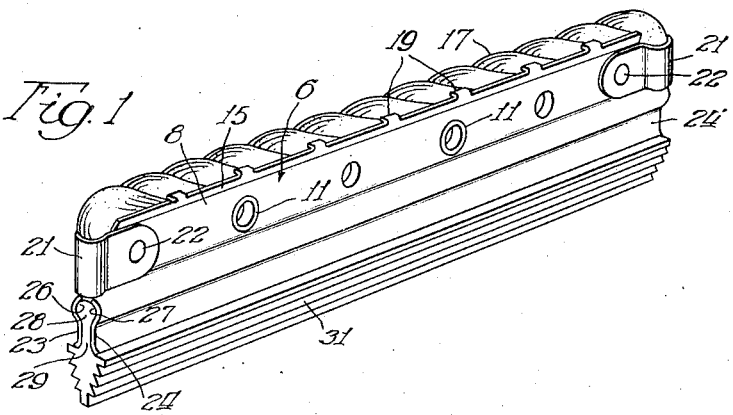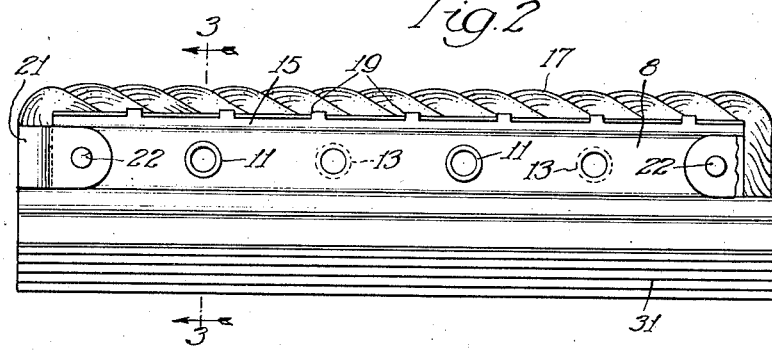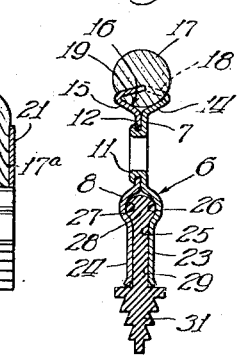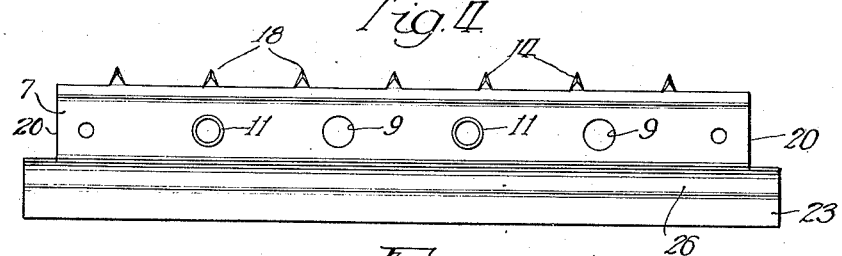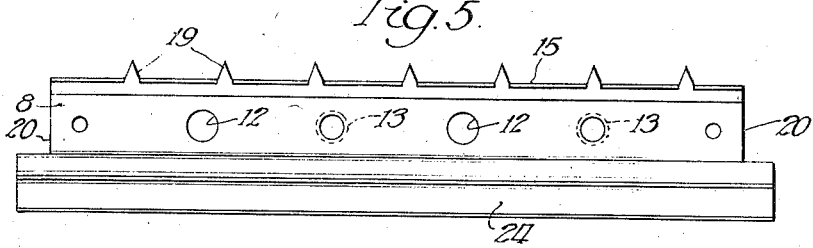
Inventor
John W. Anderson
By Hill & Hill Attys.
Witness
V. Siljander Patented May 9, 1939

UNITED STATES PATENT OFFICE 2,157,314

GLASS CLEANER

John W. Anderson, Gary, Ind., assignor to Productive Inventions, Inc., Gary, Ind., a corporation of Indiana Application November 14, 1936, Serial No. 110,788

5 Claims. (Cl. 15—209)

This invention relates to cleaners, and particularly to portable hand operated glass cleaners, which are suitable and well adapted for cleaning the glass of automobile windshields and the like.

One object of the present invention is to provide a light, compact and efficient device, for quickly and readily loosening dried bug bodies and other foreign matter from windshields and the like, and thereafter wiping the windshield clean.

Another object of the invention is to provide a device of the character described, which is convenient to handle, and which, if desired, may be carried conveniently on the person of the user.

Another object of the invention is to provide suitable means for securing and protecting a portion of the cleaning element from severe shocks of contact with other structure as, for example, the frame of a windshield or the like.

A further object of the invention is to provide a device of a design and structure which will contribute materially to economy in the cost of manufacture.

A still further object of the invention is to improve devices of the character described in sundry details hereinafter referred to and practicularly pointed out in the appended claims.

One embodiment of the present invention is shown for illustrative purposes in the accompanying drawing, in which:

Fig. 1 is a perspective view of a novel cleaner construction embodying features of the present invention;

Fig. 2 is a side elevational view of my improved cleaner shown partly in section to indicate the manner of securing the end portions of the abrading material to the handle portion of the cleaner;

Fig. 3 is an enlarged transverse sectional view taken substantially as indicated by the line 3—3 of Fig. 2; and Figs. 4 and 5 are inside and outside views, respectively, of a pair of plates comprising the handle member of the cleaner.

In the embodiment shown in the drawing, the handle member, indicated as a whole by the numeral 6, comprises a pair of substantially flat elongated plates 7 and 8 of substantially identical construction and positioned in juxtaposition with respect to each other, the plate 7 being provided with apertures 9 and with inwardly extending hollow rivet portions 11 preferably formed integrally with the plate 7 and adapted to be positioned in aperture 12 formed in the plate 8, which is also provided with hollow rivet portions 13 formed integrally with the plate 8 and adapted to be positioned in the apertures 9 of the plate 7, after which the rivet portions 11 and 13 may be headed or spread for securing the plates together intermediate their end portions.

Formed integrally with and along one of the longitudinal edge portions of the plates 7 and 8 are laterally extending oppositely disposed inclined flanges 14 and 15, respectively, forming a groove 16 adjacent one of the longitudinal edge portions of the handle member 6 adapted to receive an abrading material 17, shown in the present instance, as comprising a plurality of elongated metallic strands or fibers preferably twisted in a manner to form a rope-like structure as clearly illustrated in Figs. 1 and 2 of the drawing.

For securing the rope-like structure 17 in the groove 16 and to the respective flanges 14 and 15, the said flanges are provided, respectively, with prongs or fingers 18 and 19 arranged and adapted to be bent inwardly in overlapping relationship as illustrated in Fig. 3 in a manner to engage the fibers of the rope-like structure at opposite sides of the groove 16 for securing the abrading material therein, the end portions 17a of the rope-like structure 17 being bent inwardly against the inwardly offset end portions 20 of the plates 7 and 8 and secured in relatively fixed position with respect thereto by means of a substantially U-shaped clamping member 21 adapted to surround the end portions 17a of the rope-like structure 17 and to be secured to the handle member 6 by means of rivets 22 extending through the leg portions of the members 21 and the plates 7 and 8, the U-shaped members 21 serving also as a guard or bumper for protecting the end portions of the rope-like member from severe shocks or contact with other structure as, for example, the frame of a windshield or the like.

The opposite longitudinal edge portions 23 and 24 of the plates 7 and 8, respectively, are offset laterally and outwardly in opposite directions with respect to each other in a manner to provide a channel 25 having substantially parallel side walls along the longitudinal edge portion of the handle member 6 opposite to the groove 16, the edge portions or side walls 23 and 24 of the channel 25 being provided with elongated oppositely disposed inwardly opening recesses 26 and 27, respectively, adapted to receive an elongated rib 28 formed on a neck portion 29 of a squeegee 31, the neck portion and rib of which are adapted to be secured within the channel 25 between the side walls 23 and 24, thereof.

It will be observed from the foregoing description that the present invention provides a light, compact and efficient device for quickly and readily loosening dried bug anatomies or bodies or other foreign matter from the surface of windshields or the like by applying the abrading rope-like structure 17 thereto, and thereafter wiping the windshield clean with the squeegee 31. Also that by reason of the like construction of the plates 7 and 8, a material economy is attained in the cost of manufacturing devices embodying the present invention.

Obviously, the present invention is not limited to the precise construction and arrangement shown and described as the same may be variously modified within the scope of the appended claims. Moreover, all the features of the invention need not be used conjointly as the same may be used to advantage in variously different combinations and sub-combinations.

What I claim as new and desire to secure by Letters Patent is:

1. A cleaner comprising an elongated substantially flat handle member having a groove along one of its longitudinal edge portions, an abrading material comprising a plurality of twisted fibers positioned longitudinally in said groove, and means secured to the end portions of the handle member and engaging the end portions of said fibers for securing the abrading material to said member.

2. A cleaner comprising an elongated substantially flat handle member having a groove along one of its longitudinal edge portions, a rope-like structure comprising a plurality of twisted metallic fibers positioned longitudinally in said groove, and clamping means secured to the end portions of the handle member and engaging the end portions of said rope-like structure for securing the abrading material to the ends of said member.

3. In a cleaner, a handle member comprising a pair of elongated substantially flat plates secured together intermediate their end portions, laterally extending oppositely disposed inclined flanges adjacent one edge portion of the respective plates providing a groove adjacent a longitudinal edge portion of said handle member, a plurality of twisted metallic fibers providing a rope-like structure having its body portion positioned in said groove and its respective end portions extending beyond the respective end portions of said handle member, the said end portions of said rope-like structure extending laterally with respect to the body portion thereof and positioned adjacent the respective end portions of said handle member, inwardly extending overlapping prongs on the respective flanges engaging the body portion of said rope-like structure for securing said fibers in said groove, and means engaging the end portions of said rope-like structure for securing the ends thereof to the end portions of said handle member.

4. In a cleaner, a handle member comprising a pair of elongated substantially flat metal plates having cooperating means thereon for securing the plates together intermediate their end portions, laterally extending oppositely disposed inclined flanges adjacent one edge portion of the respective plates providing a groove adjacent a longitudinal edge portion of said handle member, a plurality of twisted metallic fibers providing a rope-like structure having its body portion positioned in said groove and its respective end portions extending beyond the respective end portions of said handle member, the said end portions of said rope-like structure extending laterally with respect to the body portion thereof and positioned adjacent the respective end portions of said handle member, inwardly extending overlapping prongs on the respective flanges engaging the body portion of said rope-like structure for securing said fibers in said groove, U-shaped clamping members engaging and covering the respective end portions of said rope-like structure for securing the end portions thereof to the adjacent end portions of the handle member, the leg portions of the respective clamping members being positioned at opposite sides of the handle member, and means for securing the respective clamping members to said handle member.

5. In a cleaner, a handle member comprising a pair of elongated substantially flat plates of substantially like construction, each of said plates having apertures therein and projections thereon, the apertures formed in the respective plates being adapted to receive the projections on the other of said plates for securing the plates together intermediate their end portions, laterally extending, oppositely disposed inclined flanges adjacent one edge portion of the respective plates providing a groove adjacent a longitudinal edge portion of said handle member, a plurality of twisted metallic fibers providing a rope-like structure positioned in said groove, inwardly extending prongs on the respective flanges engaging said fibers for securing said rope-like structure in said groove, and clamping means adjacent the respective ends of the handle member for engaging and securing the end portions of the rope-like structure thereto and for securing the end portions of the said plates together.

JOHN W. ANDERSON.